Patented Jan. 9, 1923.

1,441,664

UNITED STATES PATENT OFFICE.

ROY CROSS, OF KANSAS CITY, MISSOURI.

INK AND PROCESS OF MAKING SAME.

No Drawing.   Application filed December 29, 1919.   Serial No. 348,040.

*To all whom it may concern:*

Be it known that I, ROY CROSS, a citizen of the United States, residing in the city of Kansas City, county of Jackson, State of Missouri, have invented certain new and useful Improvements in Ink and Processes of Making Same, of which the following is a specification.

This invention relates to improvements in ink and process of making same and refers more particularly to an ineradicable ink.

The desirability and in fact the commercial operation of an ineradicable ink is too well known in the art to need elucidation. This is illustrated by the extensive use of the so called india ink. In fact, for example in many forms of legal documents, india ink is required for the reason that it is practically the only ineradicable ink now in commercial use. This india ink however, has certain well known limitations. In the first place, it is and has been expensive. It also will not flow readily from the pen and is difficult to write with. The other inks in use are eradicable and to those skilled in the art, can be readily removed by the well known ink eradicators without injuring the paper. They are also not permanent and in the course of time, fade away. It is difficult, if not impossible, to state the enormous loss in property rights that has resulted from the fading out of writing ink, particularly in old legal documents.

The objects of the present invention are to provide an ink which has among others, the following distinguishing characteristics:

It can be used as a writing fluid as readily as well known forms of ink; it is permanent in its character and will not fade and it also cannot be removed by chemical eradicators without noticeably injuring or destroying the fiber of the paper.

Finally, it can be manufactured very economically. In fact, at substantially the same cost of manufacture as the ordinary writing fluids or inks of commerce. This novel ink is made as follows:

I first make a solution of oxalic acid in water. For example, one tenth of one per cent of the oxalic acid to one hundred parts of water by weight. This may be mixed hot or cold. To this solution is then added seven-tenths of one per cent by weight of Prussian blue to the one hundred parts of water. These ingredients are then stirred or agitated until a uniform mixture is obtained. I then add five tenths of one per cent by weight of methylene blue and one tenth of one per cent of ammonium molybdate. The water is preferably distilled water.

The ink thus formed is both permanent and ineradicable and it has a viscosity suitable for readily writing with pen. If this ink is used as typewriter ink, a nondrying agent is to be used such as glycerin and the strength of the ink adjusted to typewriting equipment.

It is to be noted that the ammonium molybdate acts as a fixative agent and it prevents fading of the ink due to the formation of new color compounds containing molybdate as the ink becomes older and older. This ammonium molybdate also prevents the ink from being eradicated by oxalic acid, hypochlorite or other chemical eradicators. This is true for the reason that when these chemical eradicators are used, new colors are formed by the action of the ammonium molybdate on the product of the oxidation of the ordinary fading constituents of the ink. The Prussian blue as is well known, contains iron and the combination making ink more permanent and also giving richer color to the ink. The oxalic acid is used as a solvent agent for the Prussian blue which is not soluble in water alone.

A novel feature of this invention lies in the use of a fixing agent which prevents the fading away of the ink by forming color compounds with the products of oxidation that are commonly present in the ordinary inks of commerce as well as in this. In other words, this fixing agent forms new permanent color compounds when subjected to oxidizing action either of time or of chemical reagent.

I claim as my invention:

1. An ink which cannot be eradicated from paper without noticeably affecting the fiber thereof consisting of a colored writing fluid having as one of its constituents a fixing agent which will cause the formation of new color compounds when the ink is subjected to oxidizing influences.

2. An ink which cannot be eradicated from paper without noticeably affecting the fiber thereof consisting of a colored writing fluid having a viscosity less than that of india ink and having as one of its constituents a fixing agent which will cause the formation of new color compounds when the ink is subjected to oxidizing influences.

3. An ink which cannot be eradicated from paper without noticeably affecting the fiber thereof consisting of a colored writing fluid having as one of its constituents ammonium molybdate as a fixing agent which will cause the formation of new color compounds when the ink is subjected to oxidizing influences.

4. An ineradicable ink, consisting in a mixture of water, a coloring matter, oxalic acid and ammonium molybdate as a fixing agent.

5. An ineradicable ink, consisting in a mixture of water, Prussian blue, oxalic acid, methylene blue and ammonium molybdate.

ROY CROSS.